United States Patent
Kim et al.

(10) Patent No.: US 11,450,320 B2
(45) Date of Patent: Sep. 20, 2022

(54) DIALOGUE SYSTEM, DIALOGUE PROCESSING METHOD AND ELECTRONIC APPARATUS

(71) Applicants: HYUNDAI MOTOR COMPANY, Seoul (KR); KIA MOTORS CORPORATION, Seoul (KR)

(72) Inventors: Seona Kim, Seoul (KR); Youngmin Park, Gunpo-si (KR); Jeong-Eom Lee, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 183 days.

(21) Appl. No.: 16/918,927

(22) Filed: Jul. 1, 2020

(65) Prior Publication Data

US 2021/0090563 A1 Mar. 25, 2021

(30) Foreign Application Priority Data

Sep. 20, 2019 (KR) .................. 10-2019-0116007

(51) Int. Cl.
*G10L 15/22* (2006.01)
*G10L 13/00* (2006.01)
(52) U.S. Cl.
CPC .............. *G10L 15/22* (2013.01); *G10L 13/00* (2013.01); *G10L 2015/228* (2013.01)
(58) Field of Classification Search
USPC ................................ 704/246, 247, 251, 252
See application file for complete search history.

(56) References Cited

U.S. PATENT DOCUMENTS

| | | | |
|---|---|---|---|
| 2018/0211663 A1 | 7/2018 | Shin | |
| 2018/0330723 A1* | 11/2018 | Acero | G10L 25/78 |
| 2019/0206397 A1* | 7/2019 | Zhou | G10L 15/26 |
| 2019/0287520 A1 | 9/2019 | Lee | |
| 2020/0151258 A1* | 5/2020 | Yuan | G06F 40/30 |
| 2020/0380966 A1* | 12/2020 | Acero | G10L 15/30 |
| 2021/0082397 A1* | 3/2021 | Kennewick | G10L 25/87 |

FOREIGN PATENT DOCUMENTS

| | | |
|---|---|---|
| KR | 20140139922 A | 12/2014 |
| KR | 20180086718 A | 8/2018 |
| KR | 20190109864 A | 9/2019 |

* cited by examiner

*Primary Examiner* — Leonard Saint Cyr
(74) *Attorney, Agent, or Firm* — Lempia Summerfield Katz LLC (57) ABSTRACT

A dialogue system, a dialogue system control method, and an electronic apparatus are configured to process a user speech to generate a system response before the user's speech ends by recognizing the user's intention When the user's speech is finished, the system response is output to continue a natural dialogue flow in real time. The dialogue system includes: a Speech to Text engine to convert a user speech into text; an intermediate dialogue engine configured to process an intermediate speech before user speech is terminated; a final dialogue engine configured to process a final speech after the user speech is terminated; and a controller. The controller is configured to input the converted text to the intermediate dialogue engine when user speech is not terminated, and to input the converted text to the final dialogue engine when user speech is terminated The dialogue system also includes a Text to Speech engine configured to convert the system response into a speech signal.

19 Claims, 9 Drawing Sheets

| USER SPEECH | USER INTENTION |
|---|---|
| TURN ON AIR CONDITIONER | AIR CONDITIONER_ON |
| TURN OFF AIR CONDITIONER | AIR CONDITIONER_OFF |
| SET TEMPERATURE OF AIR CONDITIONER TEMPERATURE TO 18 DEGREES | AIR CONDITIONER_SET(18℃) |
| ⋮ | ⋮ |

LOG DB
154

DIALOGUE SYSTEM, DIALOGUE PROCESSING METHOD AND ELECTRONIC APPARATUS

CROSS-REFERENCE TO RELATED APPLICATION

This application is based on and claims priority under 35 U.S.C. § 119 to Korean Patent Application No. 10-2019-0116007, filed on Sep. 20, 2019 in the Korean Intellectual Property Office, the disclosure of which is incorporated by reference herein in its entirety.

BACKGROUND

1. Technical Field

Embodiments of the present disclosure relate to a dialogue system, a controlling method of a dialogue system, and an electronic apparatus capable of communicating with a user.

2. Description of Related Art

A dialogue system is a system that can recognize a user's speech and provide a service corresponding to the recognized speech.

The dialogue system may output a system response to provide a service corresponding to the recognized speech. The system response may include an answer to a user's question and may include a question to confirm a user's speech or may include a guide to a service to be provided.

However, since the dialogue system starts recognition after the user's speech is finished, there is a delay between the user's speech and the system response, making it difficult to continue the natural flow of the dialogue.

SUMMARY

It is an aspect of the disclosure to provide a dialogue system, a dialogue system control method, and an electronic apparatus for processing a speech of a user, i.e., a user speech, in a dialogue system to generate a system response before the user's speech ends by recognizing the user's intention, i.e., the user intention, by using an intermediate speech. When the user's speech is finished, the dialogue system, the dialogue system control method, and the electronic apparatus are configured to output the generated system response that is capable of continuing a natural dialogue flow without a delay.

In accordance with embodiments of the disclosure, a dialogue system includes: a Speech to Text (STT) engine configured to convert a user speech inputted through a microphone into text in real time; an intermediate dialogue engine configured to process an intermediate speech before a user speech is terminated to identify a user intention and generate a system response corresponding to the user intention; a final dialogue engine configured to process a final speech after the user speech is terminated; a controller configured to input the converted text to the intermediate dialogue engine when the user speech is not terminated, and to input the converted text to the final dialogue engine when the user speech is terminated; and a Text to Speech (ITS) engine configured to convert the system response into a speech signal.

Further, the intermediate dialogue engine may generate the system response corresponding to the user intention in advance before the user speech is terminated.

Further, the controller may control the TTS engine to output the pre-generated system response when the user speech is terminated.

Further, the controller may input a next user speech inputted through the microphone into the intermediate dialogue engine when the intermediate dialogue engine does not recognize the user intention.

Further, the system may further include a storage to store the final speech and the user intention, which is recognized by the final dialogue engine, corresponding to the final speech, when the user speech is terminated.

Further, the controller may generate a first intermediate speech data by deleting one word from the stored final speech and may input the first intermediate speech data to the final dialogue engine.

Further, the controller may store the first intermediate speech data in the storage when the user intention corresponding to the first intermediate speech data recognized by the final dialogue engine corresponds to the user intention corresponding to the final speech.

Further, the controller may generate a second intermediate speech data by deleting one word from the first intermediate speech data when the user intention corresponding to the first intermediate speech data recognized by the final dialogue engine corresponds to the user intention corresponding to the final speech. The controller may input the second intermediate speech data to the final dialogue engine.

Further, the controller may train the intermediate dialogue engine by using the stored first intermediate speech data.

Further, the controller may generate a rule used in the intermediate dialogue engine by using the stored first intermediate speech data.

In accordance with embodiments of the disclosure, a dialogue processing method comprises: converting a user speech inputted through a microphone into text in real time; inputting the converted text to an intermediate dialogue engine processing an intermediate speech when the user speech is not terminated; inputting the converted text to a final dialogue engine processing a final speech when the user speech is terminated; and generating a system response corresponding to the user intention recognized by the intermediate dialogue engine or the user intention recognized by the final dialogue engine.

Further, generating the system responses may include generating the system response corresponding to the user intention in advance before the user speech is terminated when the intermediate dialogue engine recognizes the user intention.

Further, the method may include outputting the pre-generated system response when the user speech is terminated.

Further, the method may include inputting a next user speech inputted through the microphone into the intermediate dialogue engine when the intermediate dialogue engine does not recognize the user intention.

Further, the method may include storing the final speech and the user intention, which is recognized by the final dialogue engine, corresponding to the final speech, when the user speech is terminated.

Further, the method may include generating a first intermediate speech data by deleting one word from the stored final speech and inputting the first intermediate speech data to the final dialogue engine.

Further, the method may include storing the first intermediate speech data in the storage when the user intention corresponding to the first intermediate speech data which the final dialogue engine recognized corresponds to the user intention corresponding to the final speech.

Further, the method may include generating a second intermediate speech data by deleting one word from the first intermediate speech data when the user intention corresponding to the first intermediate speech data recognized by the final dialogue engine corresponds to the user intention corresponding to the final speech, and inputting the second intermediate speech data to the final dialogue engine.

Further, the method may include training the intermediate dialogue engine by using the stored first intermediate speech data.

Further, the method may include generating a rule used in the intermediate dialogue engine by using the stored first intermediate speech data.

In accordance with an embodiment, an electronic apparatus comprises: a memory configured to store one or more programs; and a processor configured to process the one or more stored programs. The one or more programs may include: converting a user speech inputted through a microphone into text in a real time; inputting the converted text to an intermediate dialogue engine processing intermediate speech when the user speech is not terminated; inputting the converted text to a final dialogue engine processing final speech when the user speech is terminated; and generating a system response corresponding to the user intention recognized by the intermediate dialogue engine or to the user intention recognized by the final dialogue engine.

BRIEF DESCRIPTION OF THE DRAWINGS

These and/or other aspects of the disclosure should become apparent and more readily appreciated from the following description of embodiments, taken in conjunction with the accompanying drawings of which.

DETAILED DESCRIPTION OF THE EMBODIMENTS

Configurations shown in the embodiments and drawings described herein show various examples of the disclosure. There may be various modifications that can replace the embodiments and drawings of the present specification at the time of filing of the present application.

Also, the terminology used herein is for the purpose of describing particular embodiments only and is not intended to be limiting of the disclosure. Singular expressions include plural expressions unless the context clearly indicates otherwise. As used herein, the terms "comprise", or "have" are intended to designate that the features, numbers, steps, actions, components, parts, or combinations thereof described in the specification are present. The terms do not preclude the existence or addition of one or more other features or numbers, steps, operations, components, parts or combinations thereof in advance.

In addition, terms such as "~part", "~group", "~block", "~member", "~module" may refer to a unit for processing at least one function or operation. For example, the terms may refer to at least one hardware processed by at least one piece of hardware such as a field-programmable gate array (FPGA)/application specific integrated circuit (ASIC), at least one software stored in a memory, or a processor.

In addition, ordinal numbers such as "first" and "second" used before the components described herein are merely used to distinguish the components from each other. The ordinal numbers used before the components are not used to specify the order of connection between these components and the order of use thereof. The ordinal numbers do not have a different meaning, such as priority.

The references attached to the steps are used to identify the steps. These references do not indicate the order between the steps. Each step is performed in a different order than the stated order unless the context clearly indicates a specific order.

On the other hand, the disclosed embodiments may be implemented in the form of a recording medium for storing instructions executable by a computer. Instructions may be stored in the form of program code and, when executed by a processor, may generate a program module to perform the operations of the disclosed embodiments. The recording medium may be implemented as a computer-readable recording medium.

Computer-readable recording media may include all kinds of recording media having stored thereon instructions which can be read by a computer. For example, there may be a read only memory (ROM), a random-access memory (RAM), a magnetic tape, a magnetic disk, a flash memory, an optical data storage device, and the like.

Further, when an element in the written description and claims is described as being "for" performing or carry out a stated function, step, set of instructions, or the like, the element may also be considered as being "configured to" do so.

Hereinafter, an embodiment of a dialogue system, a dialogue processing method, and an electronic apparatus according to an aspect is described in detail with reference to the accompanying drawings.

Figure 1:
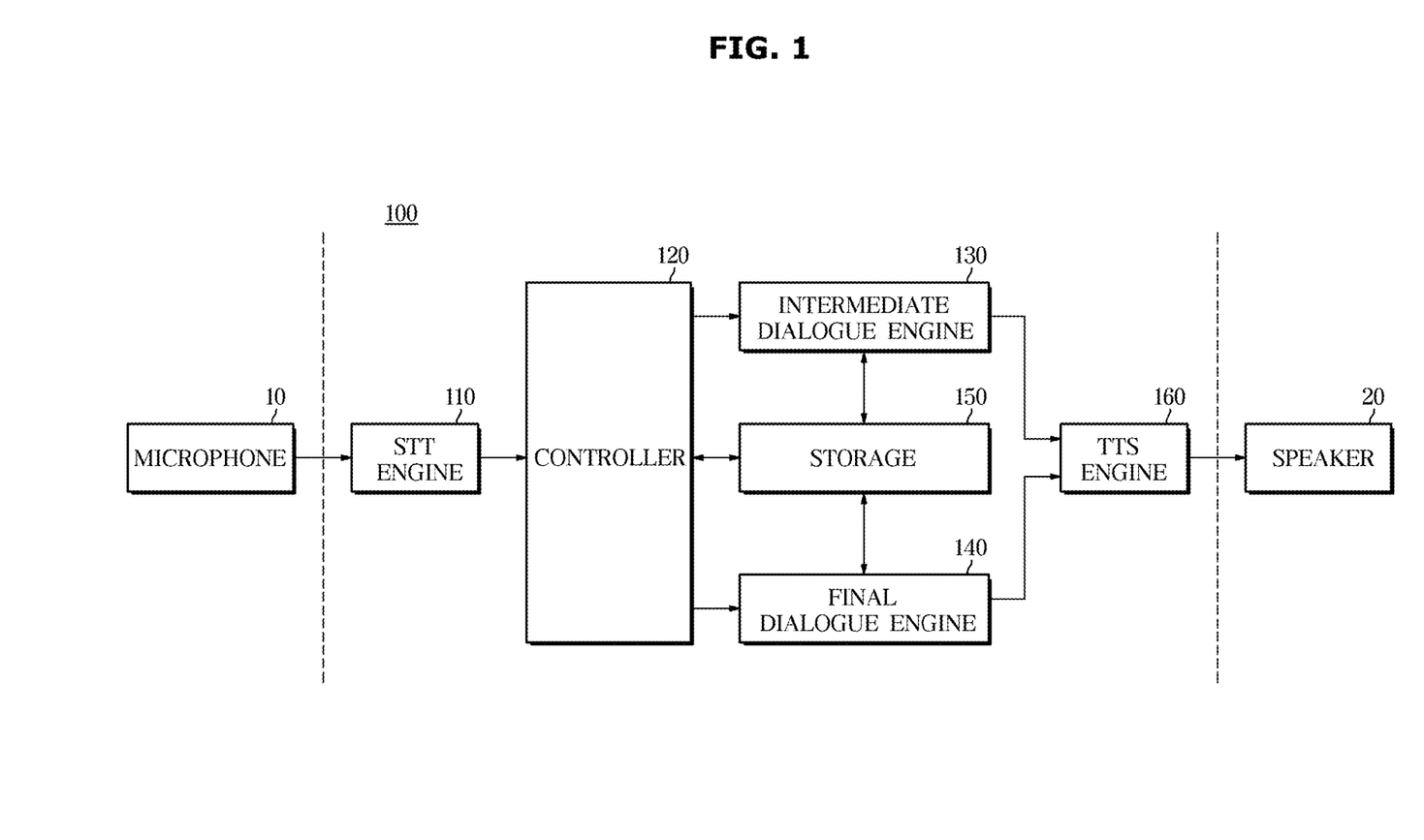
FIG. 1 is a control block diagram of a dialogue system according to an embodiment.

FIG. 1 is a control block diagram of a dialogue system according to a n embodiment. Referring to FIG. 1, a dialogue system 100 according to an embodiment may include: a Speech to Text (STT) engine 110 configured to convert a user speech inputted through a microphone 10 into text in real time; an intermediate dialogue engine 130 configured to process an intermediate speech before a user speech is terminated to identify a user intention and generate a system response corresponding to the user intention; a final dialogue engine 140 configured to process a final speech after the user speech is terminated; a controller 120 configured to input the converted text to the intermediate dialogue engine 130 when the user speech is not terminated, and to input the converted text to the final dialogue engine 140 when the user speech is terminated; a storage 150 configured to store various data necessary for the operation of the dialogue system 100; and a Text to Speech (TTS) engine 160 configured to convert the system response into a speech signal. The system response converted into the voice signal may be output through a speaker 20.

According to an embodiment, the dialogue system 100 may be implemented as a server. In this case, the components 110, 120, 130, 140, 150, and 160 of the dialogue system 100 may be provided in the server. However, it is also possible for some of the components 110, 120, 130, 140, 150, 160 of the dialogue system 100 to be provided in a user terminal connecting the dialogue system 100 with the user.

According to an embodiment, the dialogue system 100 may include at least one memory for storing a program and related data, and at least one processor for executing the stored program.

It is also possible for the STT engine 110, the controller 120, the intermediate dialogue engine 130, the final dialogue engine 140 and the TTS engine 160 to use separate memory and processors, some of which may share memory and processors.

In addition, the controller 120 may be provided in a separate configuration. The operations of the controller 120 to be described later may be performed in a configuration related to the corresponding operation among the STT engine 110, the intermediate dialogue engine 130, the final dialogue engine 140, and the TTS engine 160. For example, the operation related to the control of the intermediate dialogue engine 130 during the operation of the controller 120 may be performed by the intermediate dialogue engine 130.

In other words, the components in this embodiment are classified based on the operation, not the physical location or configuration. Therefore, even if the dialogue system does not have a separate processor, called a controller, the operation of the controller 120 described herein may refer to the operation of a processor called a dialogue engine and does not depart from the scope of the dialogue system 100 according to an embodiment.

In addition, in some cases, a dialogue system may not provide an intermediate dialogue engine and a final dialogue engine separately. In this case, a dialogue engine performs the operations of the intermediate dialogue engine 130 and the final dialogue engine 140 as described throughout the present disclosure. In this embodiment, the dialogue engine is included in the scope of the dialogue system (100). In other words, a program that performs operations of the intermediate dialogue engine 130 and a program that performs operations of the final dialogue engine 140 may be executed in one processor, or both the operation of the intermediate dialogue engine 130 and the operation of the final dialogue engine 140 may be executed in one program.

For example, when the user terminal is a vehicle, some of the components of the dialogue system 100 may be provided in the vehicle. When the user terminal is a mobile device such as a smartphone, a smart artificial intelligence (AI) speaker or a PC, some of the components of the dialogue system 100 may be provided in the mobile device, the AI speaker or the PC.

Alternatively, the user may download and use a program for performing some functions of the components of the dialogue system 100 on the user terminal.

The microphone 10 and the speaker 20 may be provided in a user terminal such as a vehicle, a mobile device, or a PC. The user terminal may be connected to the dialogue system 100 through wireless communication. Although not shown in the control block diagram of FIG. 1, the dialogue system 100 may further include a wireless communication module that may exchange data with the user terminal through wireless communication.

User speech input through the microphone 10 may be transmitted to the wireless communication module of the dialogue system 100 in the form of a streaming signal.

The STT engine 110 may convert speech into text by applying a speech recognition algorithm to user speech transmitted in the form of a streaming signal. For example, feature vector extraction techniques such as Cepstrum, Linear Predictive Coefficient (LPC), Mel Frequency Cepstral Coefficient (MFCC), or Filter Bank Energy by applying the feature vector of the voice signal corresponding to the user speech may be extracted.

The recognition result may be obtained by comparing the extracted feature vector with the trained reference pattern. To this end, an acoustic model for modeling and comparing signal characteristics of speech and a language model for modeling linguistic order relations such as words or syllables corresponding to a recognized vocabulary may be used.

The acoustic model may be further divided into a direct comparison method and a statistical method. The direct comparison method sets a recognition object as a feature vector model and compares it with a feature vector of speech data. The statistical method statistically processes the feature vector of the recognition object.

The direct comparison method is a method of setting a unit of a word, a phoneme, or the like to be recognized as a feature vector model and comparing how similar the input speech is. According to the vector quantization method, a feature vector of input speech data is mapped with a codebook, which is a reference model, and encoded as a representative value, thereby comparing the code values.

The statistical model method is a method of constructing a unit for a recognition object into a state sequence and using a relationship between state columns. The status column may consist of a plurality of nodes. Methods using the relationship between the state columns again include dynamic time warping (DTW), Hidden Markov models (HMM), and neural networks.

Dynamic time warping is a technique for compensating for differences in the time axis when considering the dynamic characteristics of speech whose length varies over time even when the same person pronounces the same pronunciation. The HMM assumes speech as a Markov process with state transition probabilities and observation probabilities of nodes (output symbols) in each state. The HMM then estimates the state transition probabilities and observation probabilities of the nodes from the training data. In the estimated model, the HMM calculates the probability that an input voice will occur as a recognition technique.

On the other hand, a language model for modeling linguistic order relations such as words or syllables may apply acoustic relations between units constituting the language to units obtained in speech recognition, thereby reducing acoustic ambiguity and reducing recognition errors. The linguistic model has a model based on a statistical language model and a finite state automata (FSA), and the statistical linguistic model uses a chain probability of words such as Unigram, Bigram, and Trigram.

The STT engine 110 may use any of the methods described above in recognizing and converting a voice signal corresponding to a user's speech into text. For example, an acoustic model with a Hidden Markov model may be used, or an N-best search method that integrates the acoustic model and the speech model. The N-best search method can improve recognition performance by selecting up to N recognition result candidates using acoustic models and language models, and then re-evaluating the ranks of these candidates.

In addition, the STT engine 110 may calculate a confidence score in order to secure the reliability of the recognition result. The confidence score is a measure of how reliable the result is for a speech recognition result. It can be defined as a relative value of the phoneme or word that is a recognized result and the probability that the word is spoken from other phonemes or words. Therefore, the reliability score may be expressed as a value between 0 and 1 or may be expressed as a value between 0 and 100. If the confidence score is greater than a predetermined threshold, the recognition result may be recognized, and if the confidence score is small, the recognition result may be rejected.

The STT engine 110 may determine whether the user speech is terminated by applying an end point detection (EPD) algorithm to the voice signal corresponding to the user speech. Various EPD algorithms are known in the speech recognition field. The STT engine 110 may use any of the known algorithms.

The STT engine 110 may convert the user speech input to the microphone 10 into text in real time and output the text regardless of whether the user speech is terminated. In this case, the EPD may be performed together. The text and the EPD result converted in real time may be output together.

The intermediate dialogue engine 130 and the final dialogue engine 140 may apply natural language understanding to the text output from the STT engine 110 to grasp the user's intention corresponding to the user's speech. Hereinafter, descriptions commonly applied to the intermediate dialogue engine 130 and the final dialogue engine 140 are referred to collectively as a dialogue engine.

The dialogue engine performs stemming on the user's speech in text form and converts the input string into a stemming sequence. The dialogue engine may also recognize the entity name from the user's speech. The entity name is a proper noun such as a person's name, place name, organization name, time, date, currency, and the like. The entity name recognition is the task of identifying the entity name in the sentence and determining the type of the entity name identified. By recognizing individual names, we can extract important keywords from sentences to understand the meaning of sentences.

The dialogue engine may extract the domain from a user speech. Domains can identify the subject of the language the user speaks. For example, domains representing various subjects such as text, navigation, schedule, weather, traffic, vehicle control, and the like may be stored in a database in the storage 150.

The dialogue engine may analyze the speech act of the user speech. Speech act analysis is configured to analyze the intention of the user's speech, and to grasp the intention of the user speech such as whether the user asks a question, makes a request, makes a response, or expresses a simple emotion.

The dialogue engine may grasp the user's intention based on information such as domain, entity name, speech act, and the like corresponding to the user's speech and may extract an action corresponding to the user's intention. An action may be defined by an object and an operator.

For example, when the identified user intention is [run air conditioner], the corresponding action may be defined as: "air conditioner(object)_ON (operator)". When the recognized user intention is [text transfer], the corresponding action may be defined as: "character(object)_transfer (operator)".

In addition, the dialogue engine may extract factors related to performing an action. The factors associated with performing the action may be valid factors directly required to perform the action or may be invalid factors used to extract such valid factors.

For example, if the text output by the STT engine 110 is "Send Text to Gill-dong", then the dialogue engine determines that the domain corresponding to the user's speech is "character", the action is "send character", and the speech act corresponds to a "request".

The object name "Gill-dong" corresponds to {Factor1: Recipient} related to performing the action. However, in order to actually send the text, the {Factor2: specific Message Contents} is required. In this case, the dialogue system 100 may output the system response: "Please tell me the message to send" to obtain the specific message content from the user.

On the other hand, the difference between the intermediate dialogue engine 130 and the final dialogue engine 140 is that the intermediate dialogue engine 130 handles the intermediate speech before the user speech is terminated. In other words, the intermediate dialogue engine 130 may determine the user's intention by analyzing the sentence even if it is not a complete sentence processed by applying general natural language understanding technology.

To this end, the dialogue system 100 may perform learning for the intermediate speech processing as described below or may establish a rule for the intermediate speech processing.

The controller 120 inputs the text output from the STT engine 110, i.e., the text of the intermediate speech, to the intermediate dialogue engine 130 when the user speech is not finished. When the user speech is finished, the text output from the STT engine 110, i.e., the text of the final speech, may be input to the final dialogue engine 140.

As described above, since the STT engine 110 outputs the EPD result along with the text corresponding to the user speech, the controller 120 may determine whether the user speech is terminated based on the EPD result output from the STT engine 110.

As described above, the intermediate dialogue engine 130 and the final dialogue engine 140 analyze the input intermediate speech and the final speech, respectively, to grasp the user's intention. If the user's intention is successfully recognized, the result can be outputted. The output of the intermediate dialogue engine 130 and the final dialogue engine 140 may include an action corresponding to the user's intention, factors related to the action, and a system response corresponding thereto.

The intermediate dialogue engine 130 may generate a system response corresponding to the user intention. For example, if the user's intention is to run the air conditioner, the intermediate dialogue engine 130 can generate a system response that says, "Do you want to run the air conditioner?". If the user's intention is to send a text, the intermediate dialogue engine 130 can generate a system response, "Who will you send the text to?".

However, when the intermediate dialogue engine 130 fails to recognize the user intention corresponding to the intermediate speech, the final dialogue engine 130 may identify the user intention corresponding to the final speech and generate a system response corresponding to the user intention. The generated system response is input to the TTS engine 160. The TTS engine 160 may convert the system response into a voice signal.

The intermediate dialogue engine 130 may generate a system response corresponding to the user's intention before the user speaks. In addition, since the intermediate dialogue engine 130 processes the intermediate speech before the user speech is terminated to generate a system response, the TTS engine 110 may also convert the system response into a voice signal before the user speech is terminated.

In addition, the controller 120 may control the TTS engine 110 to output a system response generated immediately after user speech is terminated. Since the delay between user speech and system response is reduced, the user can feel as if they are actually talking and can improve the usability of the dialogue system.

Figure 2:
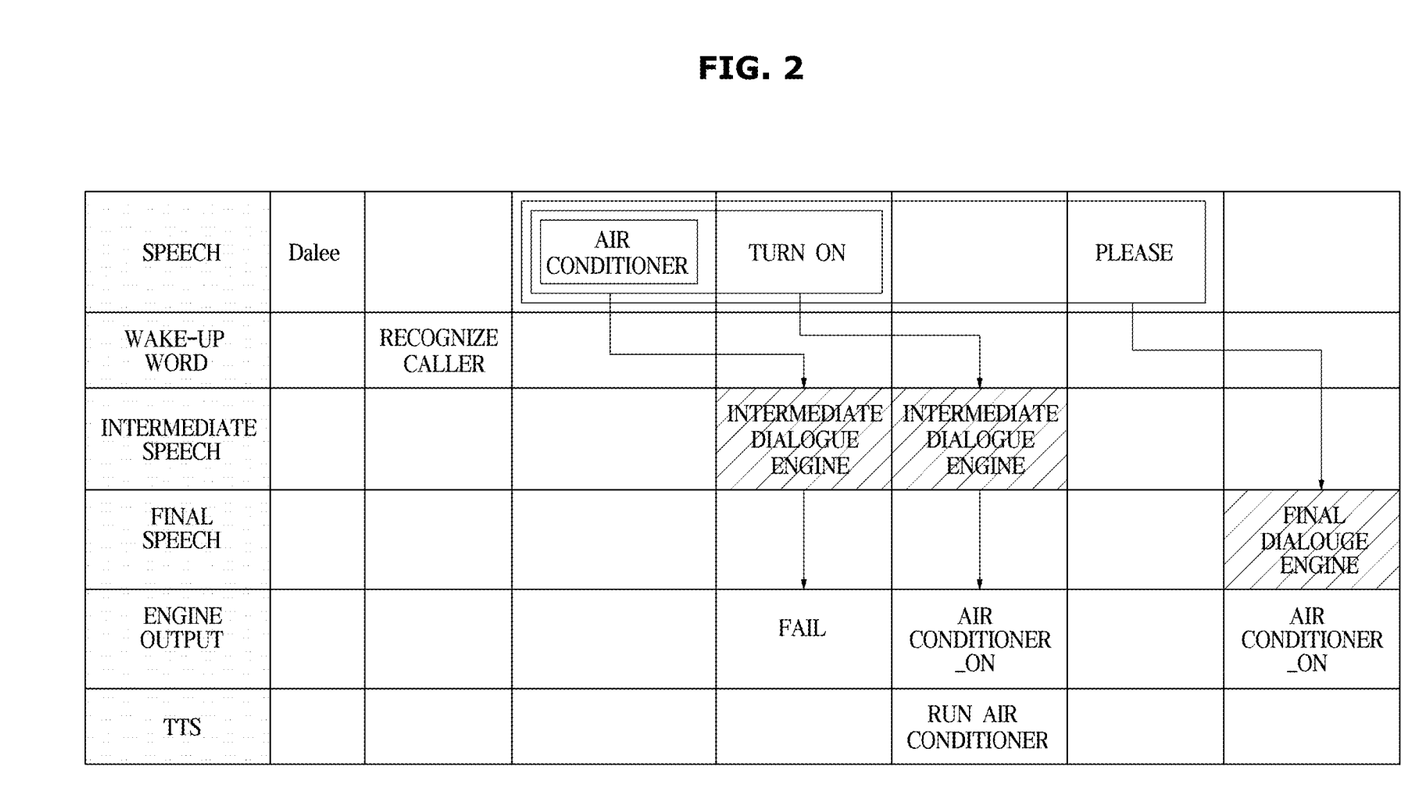
FIG. 2 is a diagram illustrating an example of a dialogue system processing a user speech according to an embodiment.

FIG. 2 is a diagram illustrating an example of a dialogue system processing a user speech according to an embodiment.

Referring to FIG. 2, an operation of the dialogue system 100 is described below by taking an example in which the user's final speech is "Dalee! Air conditioner turn on please". In this example, "Dalee" is the wake-up word of the dialogue system (100).

When the user speech is input through the microphone 10, the STT engine 110 converts the input user speech into text in real time. If the STT engine 110 even enters the "Dalee", STT Engine 110 can convert it to text and recognize that a wake-up word has been entered. When the wake-up word is recognized, the dialogue system (100) is activated.

If the "air conditioner" is entered after the wake-up word "Dalee", the STT 110 engine can convert it to text and output it with the EPD result (not the end of a speech). Thus, the "air conditioner" becomes the intermediate speech.

The controller 120 may enter an intermediate speech "air conditioner" into the intermediate dialogue engine 130. When the intermediate dialogue engine 130 handles "air conditioner", it is difficult to determine the user intention. Therefore, the processing result is a failure.

The controller 120 may input the next user speech input through the microphone 10 to the intermediate dialogue engine 130 when the intermediate dialogue engine 130 does not recognize the user intention, in other words, when the processing result of the intermediate dialogue engine 130 fails.

In this example, the next user speech input can be entered into the intermediate dialogue engine 130 up to the next air conditioner, "on". The intermediate dialogue engine 130 may apply natural language understanding techniques to identify user intention corresponding to the intermediate speech "turn on air conditioner".

The intermediate dialogue engine 130 may identify the user's intention corresponding to the intermediate speech "turn on the air conditioner" as "execution of the air conditioner" and generate a system response corresponding to the user's intention. In this example, a system response of "execute air conditioning" may be generated to confirm user intention and guide a service provided.

If the input of the next user's speech "will you" is inputted, and the EPD result included in the output of the STT engine 110 indicates the end of the speech, the controller 120 may input the final speech, "Please turn on the air conditioner" into the final dialogue engine 140. The processing result of the final dialogue engine 140 may be stored in the storage 150 as described below.

In addition, the controller 120 may control the TTS engine 160 when the user speech is terminated and output a pre-generated service response.

On the other hand, in an example, when the user's intention is successfully determined using the intermediate speech as described above, there may be a case where the user's intention cannot be determined using the intermediate speech. In this case, it is possible to generate a system response corresponding to the user intention identified in the final dialogue engine 140.

Figure 3:
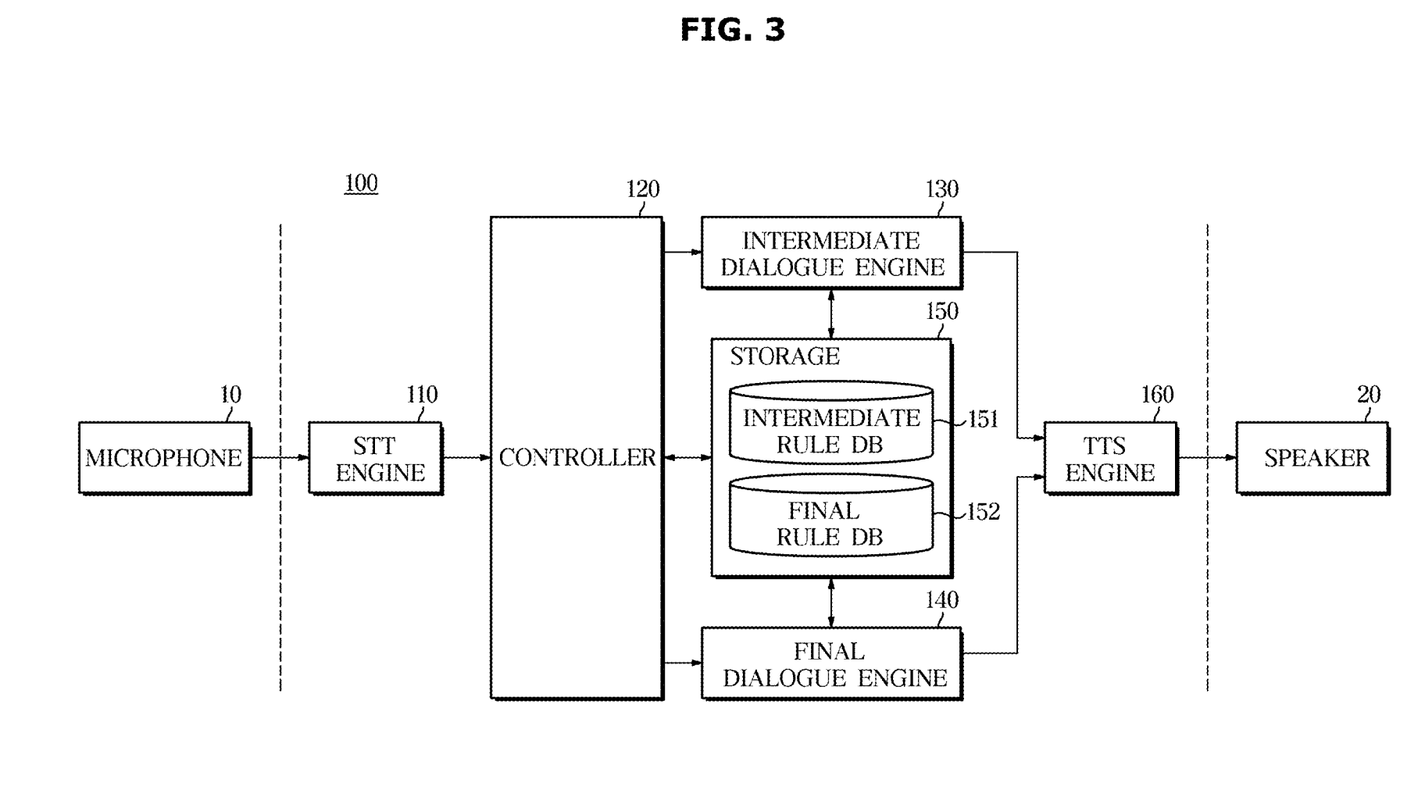
FIGS. 3 and 4 illustrate examples of a database stored in a storage of a dialogue system.
Figure 4:
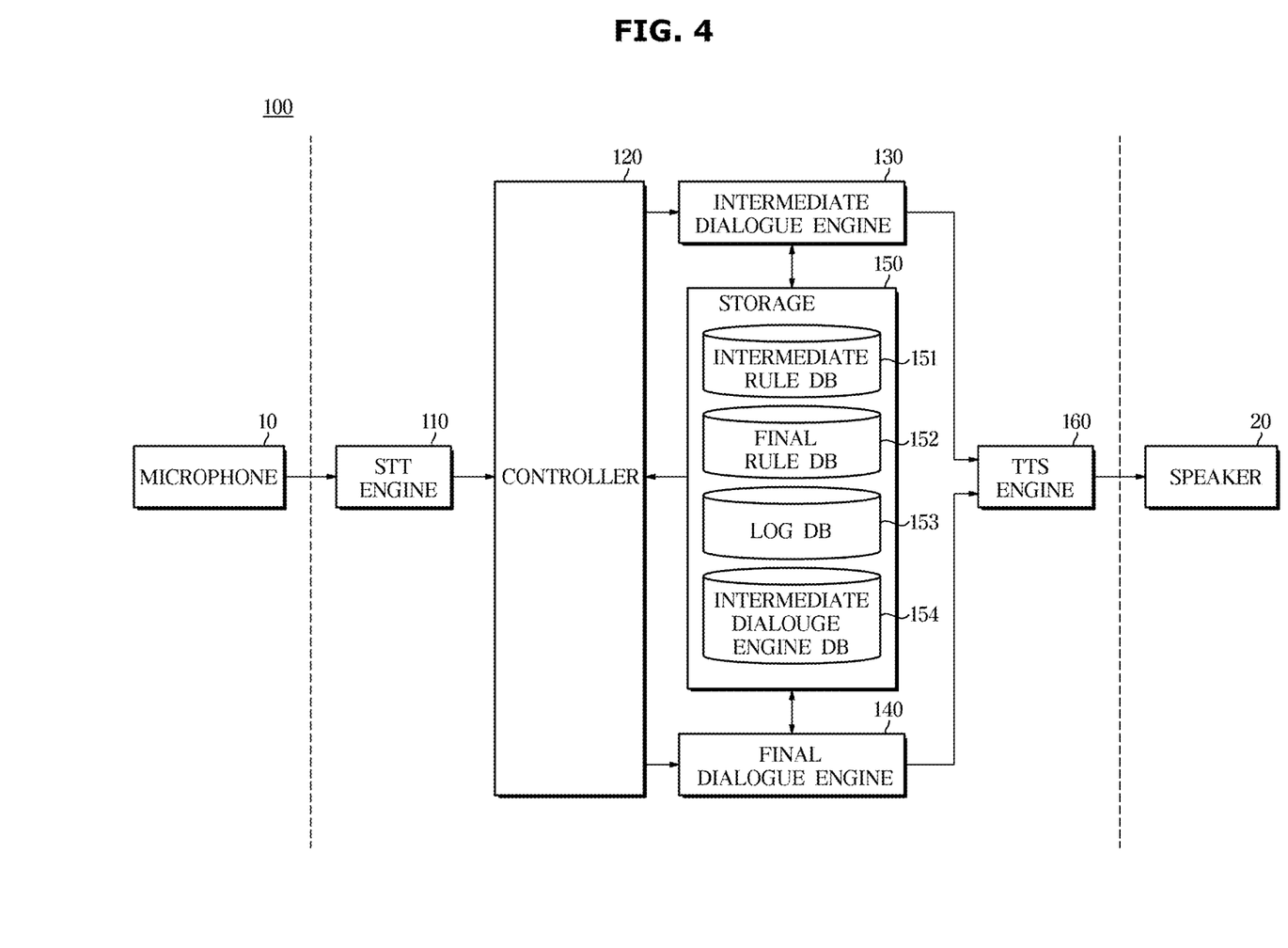
Figure 5:
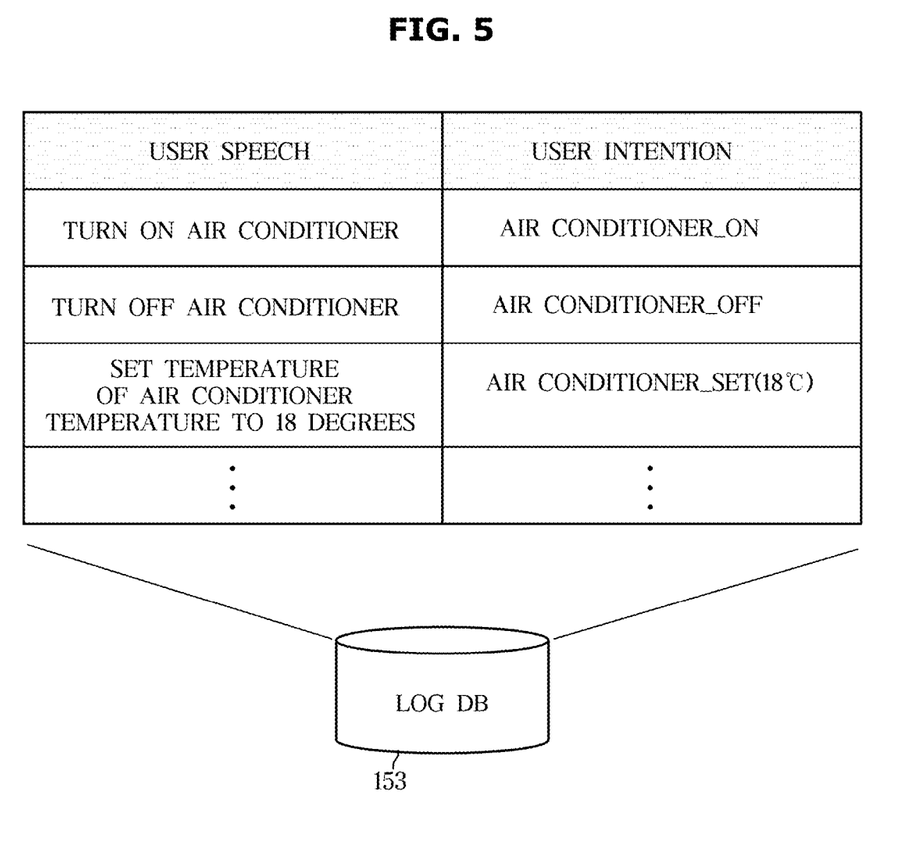
FIGS. 5 and 6 illustrate examples of data processing for constructing an intermediate dialogue engine.
Figure 6:
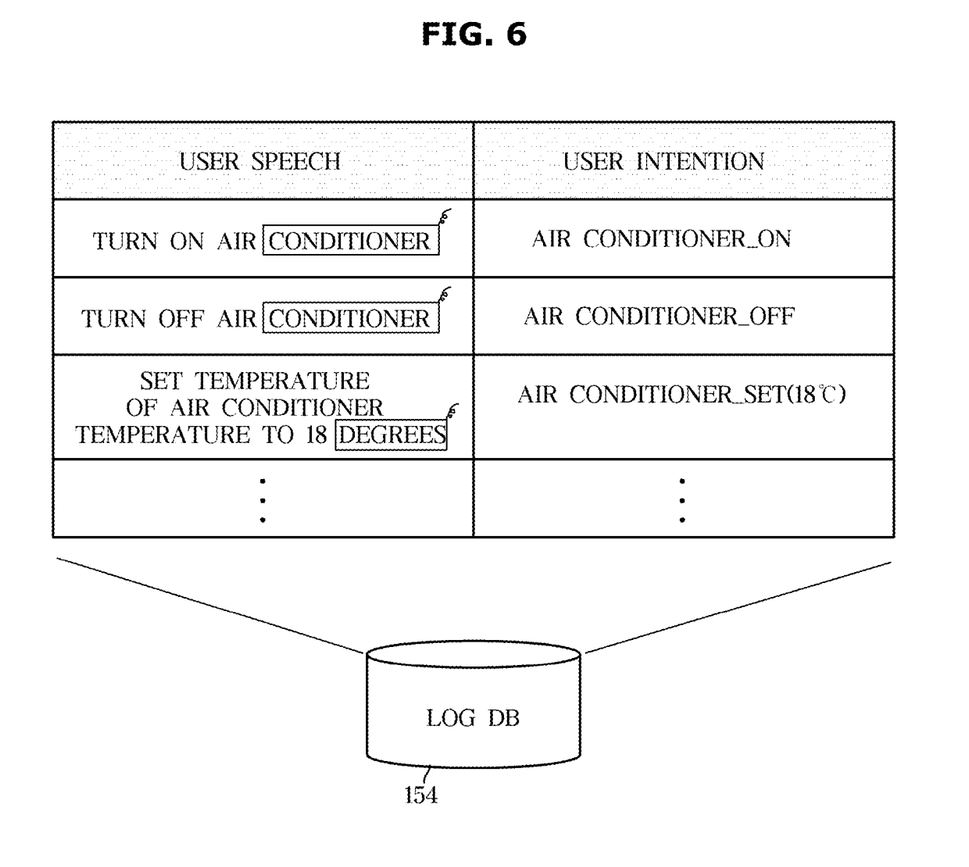
Figure 7:
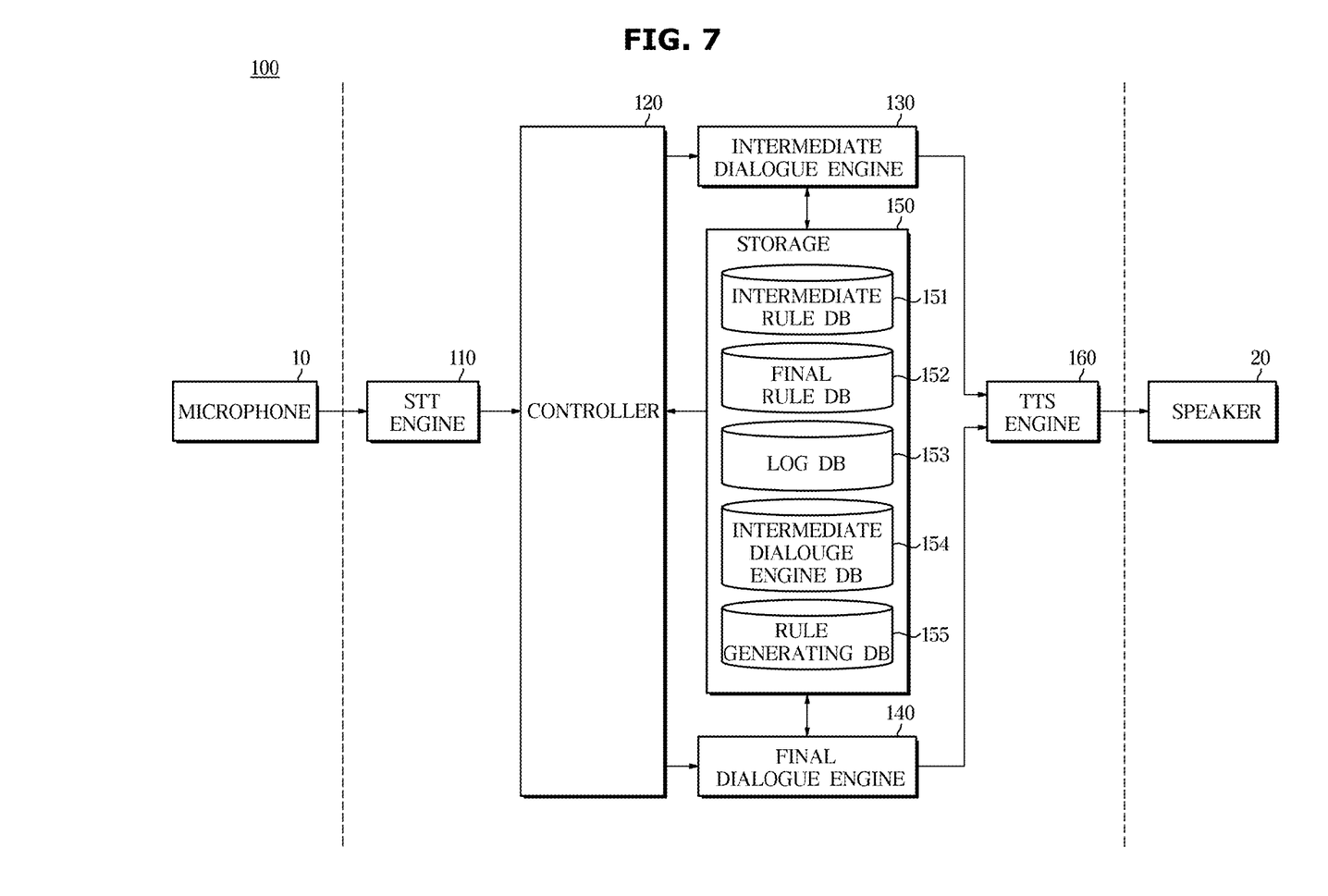
FIG. 7 illustrates another example of a database stored in a storage of a dialogue system.

FIGS. 3, 4 and 7 illustrate examples of a database (DB) stored in a storage of a dialogue system. FIGS. 5 and 6 illustrate examples of data processing for constructing an intermediate dialogue engine.

The dialogue system 100 according to an embodiment may use a rule-based dialogue processing algorithm or may use a learning-based dialogue processing algorithm. In the case of using a rule-based dialogue processing algorithm, as shown in FIG. 3, rules used for dialogue processing are stored.

Referring to FIG. 3, the storage 150 may include an intermediate rule DB 151 used for dialogue processing of the intermediate dialogue engine 130 and a final rule DB 152 used for dialogue processing of the final dialogue engine 140.

The storage 150 may include non-volatile memory such as read only memory (ROM), erasable programmable read only memory (EPROM), electrically erasable programmable read only memory (EPROM), flash memory, and the like. The storage 150 may include a volatile memory such as static random access memory (S-RAM), and a dynamic random access memory (D-RAM). Depending on the type of information to be stored, it may be stored in the nonvolatile memory or may be stored in the volatile memory.

The intermediate rule DB 151 may store a rule for identifying a user intention included in the intermediate speech, a rule for generating a system response corresponding to the user intention, and the like.

Also, the final rule DB 152 may store a rule for identifying a user intention included in the final speech, a rule for generating a system response corresponding to the user intention, and the like.

The processing result of the final dialogue engine can be used to construct or update the intermediate dialogue engine 130. A description with reference to FIGS. 4-6 is provided below.

Referring to FIG. 4, the storage 150 may include a log DB 153 for storing log data of a final dialogue engine and an intermediate dialogue engine DB 154 for storing data used for building or updating an intermediate dialogue engine.

The log data may include textual user speeches and user intention recognized by the final dialogue engine 140.

As shown in FIG. 5, a user's intention determined by the final dialogue engine 140 may be matched with the user's speech in the form of text input to the final dialogue engine 140. For example, the user speech, "Turn on the air conditioner", may be matched and stored with a corresponding user intention [air conditioner_on]. The user speech, "Turn off the air conditioner", may be matched and stored with a corresponding user intention [air conditioner_off]. The user speech, "Set temperature of the air conditioner to 18 degrees", may be matched and stored with the user intention [air conditioner_set (18° C.)].

The controller 120 processes the log data stored in the log DB 153 to generate data to be used to construct or update the intermediate dialogue engine 130.

For example, the intermediate dialogue data may be generated by deleting one word from the user speech stored in the log DB 153. The generated intermediate dialogue data may be input to the final dialogue engine 140. If the user intention determined by the final dialogue engine 140 matches the user intention stored in the log DB 153, the intermediate dialogue data may be stored in the intermediate dialogue engine DB 154.

The above-described process may be repeated by deleting one more word until the final dialogue engine 140 fails to recognize the user intention, or until the user intention determined by the final dialogue engine 140 does not match the user intention stored in the log DB 153.

Specifically, the first intermediate speech data may be generated by deleting one word from the user speech stored in the log DB 153. The first intermediate speech data may be input to the final dialogue engine 140. If the user intention corresponding to the first intermediate speech data grasped by the final dialogue engine 140 matches the user intention stored in the log DB 153, the first intermediate speech data may be stored in the intermediate dialogue engine DB 154.

Specifically, the first intermediate speech data may be generated by deleting one word from the user speech stored in the log DB 153. The first intermediate speech data may be input to the final dialogue engine 140. If the user intention corresponding to the first intermediate speech data recognized by the final dialogue engine 140 matches the user intention stored in the log DB 153, the first intermediate speech data may be stored in the intermediate dialogue engine DB 154.

The intermediate dialogue engine 130 may be updated by the intermediate speech data stored in the DB 154 for the intermediate dialogue engine. In this example, the update may include learning using the stored data or generating a new rule.

The controller 120 may generate a second intermediate speech data by further deleting one word from the first intermediate speech data. The controller 120 may input the second intermediate speech data to the final dialogue engine 140. If the user intention corresponding to the second intermediate speech data recognized by the final dialogue engine 140 matches the user intention stored in the log DB 153, the second intermediate speech data may also be stored in the intermediate dialogue engine DB 154. The intermediate dialogue engine 130 can be updated again by the added data.

The final dialogue engine 140 may repeat the above process until the user's intention is not understood or is different from the user's intention stored in the log DB 154.

Referring to FIG. 6, when the first intermediate speech data, "turn on air", generated by deleting one word from the user speech, "turn on air conditioner", stored in the log DB 153 is entered into the final dialogue engine 140, if the user intention output from the final dialogue engine 140 is [air conditioner_ON], the controller 120 matches the first intermediate speech data, "turn on air", with the user intention [air conditioner_ON] and stores the result in the intermediate dialogue engine DB 154.

The final dialogue engine 140 outputs the first intermediate speech data, "turn off air", generated by deleting one character from the user speech, "turn off air conditioner", stored in the log DB 153. If the user intention is [air conditioner_OFF], the controller 120 may match the first intermediate speech data, "turn off air", with the user intention [air conditioner_OFF] and store it in the intermediate dialogue engine DB 154.

In addition, when the first intermediate speech data, "please set temperature of air conditioner to 18", generated by deleting one word from the user speech, "please set temperature of air conditioner to 18 degrees", stored in the log DB 153 is entered into the final dialogue engine 140, and if the user intention output from the final dialogue engine 140 is [air conditioner_set(18)], the controller 120 matches the first intermediate speech data, "please set temperature of air conditioner to 18", with the user intention [air conditioner_set(18° C.).] stored in the dialogue engine DB 154.

In an example of a rule used by the intermediate dialogue engine 130 to identify the user intention, a lexical semantic pattern may be used. Accordingly, the controller 120 may generate a lexical semantic pattern based on intermediate speech data stored in the intermediate dialogue engine DB 154.

In addition, when generating rules, data that the final dialogue engine 140 fails to be recognized to match with a user intention among the intermediate speech data may be used. Therefore, in this case, the data that the final dialogue engine 140 fails to be recognized to match with a user's intention among the intermediate speech data that has one word deleted from the user speech, may be stored in a separate rule generation DB 155 as shown in FIG. 7. In this case, data obtained by differently identifying the user intention is not used.

The rules used in the intermediate dialogue engine 130 can also be created manually by the user. In detail, data that the final dialogue engine 140 fails to be recognized to match with a user intention stored in the rule generation DB 155 may generate a rule by directly recognizing the intention of the user.

For example, when the user speech stored in the log DB 153 is "please execute the air conditioner", the first intermediate speech data "execute the air conditioner" that has one word deleted may be recognized by the final dialogue engine 140. Accordingly, the second intermediate speech data "the air conditioner" stored in the intermediate dialogue engine DB 154 has one more word deleted. In this example, the second intermediate speech data is stored in the DB 155 for rule generation because the user intention is not understood in the final dialogue engine 140.

In another example, when the user speech stored in the log DB 153 is "please align downward direction of the air conditioner", the first intermediate ignition data, "align the air conditioner direction", which has one word deleted may be recognized by the final dialogue engine 140. Therefore, the second intermediate speech data, "direction of the air conditioner", stored in the intermediate dialogue engine DB 154 which has one more word deleted is not able to be recognized to match the user's intention in the final dialogue engine 140. Therefore, the second intermediate speech data can be stored in the rule generation DB 155.

The user may manually create a rule by using the intermediate speech data stored in the rule generation DB 155. For example, "direction of the air conditioner" can be understood if the user recognizes the intention manually. Therefore, the rule may be generated as follows: <user speech: direction of the air conditioner→user intention: [air conditioner_direction (downward)]>.

On the other hand, since the "air conditioning" stored in the DB for rule generation 155 cannot be understood manually, it is not used for rule generation.

Hereinafter, a dialogue processing method according to an embodiment is described. The dialogue system according to the above-described embodiments may be used in implementing the dialogue processing method according to an embodiment. Therefore, the contents described with reference to FIGS. 1-7 may be applied to the embodiment of the dialogue processing method even if it is not mentioned otherwise. The following description of the embodiment of the dialogue processing method may also be applied to the embodiment of the dialogue system.

Figure 8:
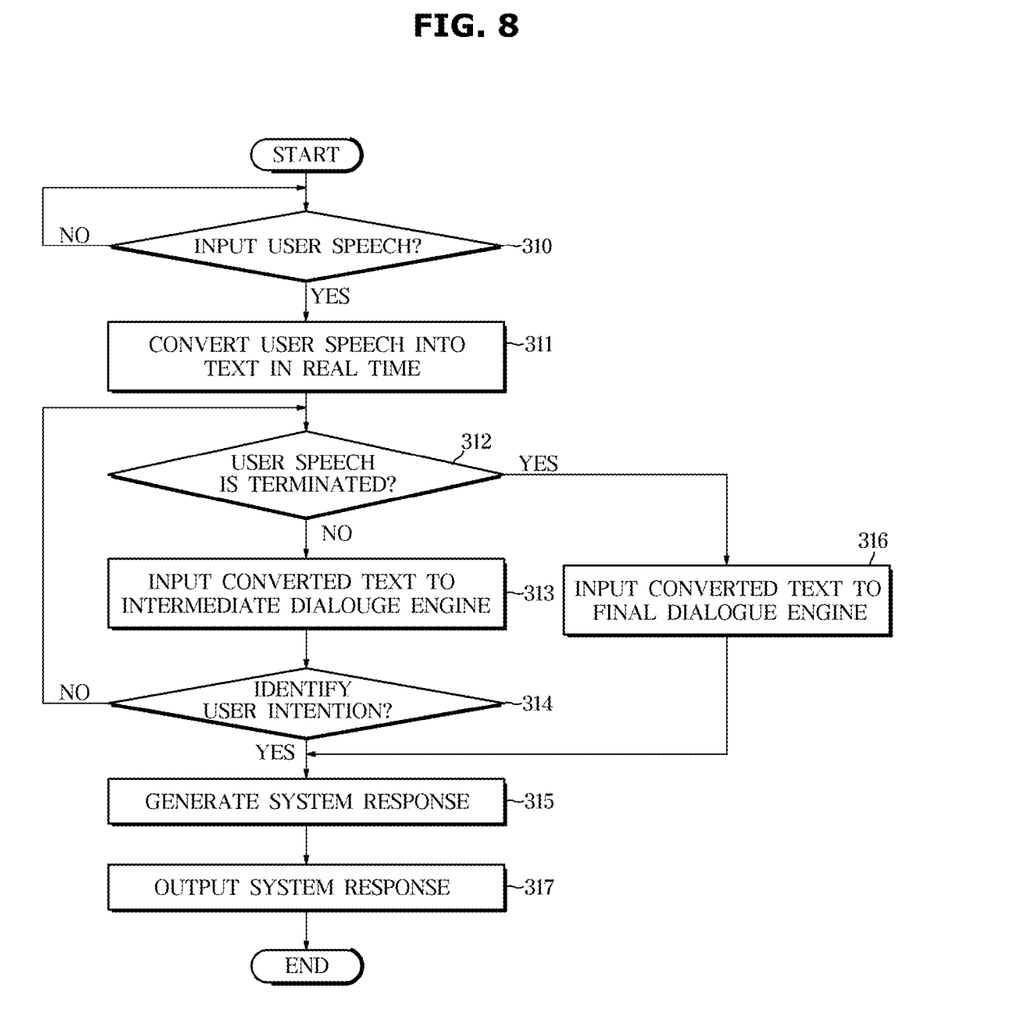
FIG. 8 is a flowchart of a dialogue processing method, according to an embodiment.

FIG. 8 is a flowchart of a dialogue processing method, according to an embodiment.

According to the dialogue processing method illustrated in FIG. 8, when a user speech is input through the microphone 10 (Yes in 310), the user speech is converted into text in real time (311).

As described above, when the user speech is input to the STT engine 110 in the form of a streaming signal, the STT engine 110 may convert the input user speech into text in real time and output the text. At this time, the EPD result may also be output.

If the user's speech has not ended (NO in 312), the converted text is input into the intermediate dialogue engine 130 (313). If the user's speech is finished (YES in 312), the converted text is input to the final dialogue engine 140 (316).

The controller 120 may determine whether to end the user speech based on the EPD result output from the STT engine 110. Therefore, if the EPD result indicates that the user's speech is not the end of the user's speech, the converted text, i.e., the text of the intermediate speech, is input into the intermediate dialogue engine 130. If the EPD result indicates the end of the user's speech, the converted text, i.e., the text of the final speech, is input into the final dialogue engine 140.

If the intermediate dialogue engine 130 has recognized the input text, i.e., the user intention corresponding to the intermediate speech (Yes in 314), the system generates a system response corresponding to the user intention identified by the intermediate dialogue engine 130 before the user speech is finished (315). If the intermediate dialogue engine 130 does not recognize the user intention corresponding to the intermediate speech, the text of the next user speech inputted through the microphone 10 is input to the intermediate dialogue engine 130.

If the intermediate dialogue engine 130 has recognized the user intention corresponding to the intermediate speech, the system response may be generated in advance before the user utterance is terminated.

When the user speech is finished, a pre-generated system response is output (317). If the intermediate dialogue engine fails to recognize the user intention using the intermediate speech, the final dialogue engine 140 generates a system response corresponding to the user intention determined using the final speech (315).

The TTS engine 317 may convert the generated system response into a voice signal. The system response converted into the voice signal may be output to the user through the speaker 20 provided in the user terminal.

On the other hand, when the user speech is long, the user speech may be continued even when the generation of the system response is completed. The controller 120 may control the TTS engine 160 to hold the output of the system response until the user speech is terminated and output the system response after the user speech is terminated.

In addition, the user intention and the final speech recognized by the final dialogue engine 140 are stored in the log DB 153 and used for updating the intermediate dialogue engine 130. Hereinafter, the process of updating the intermediate dialogue engine 130 is described below.

Figure 9:
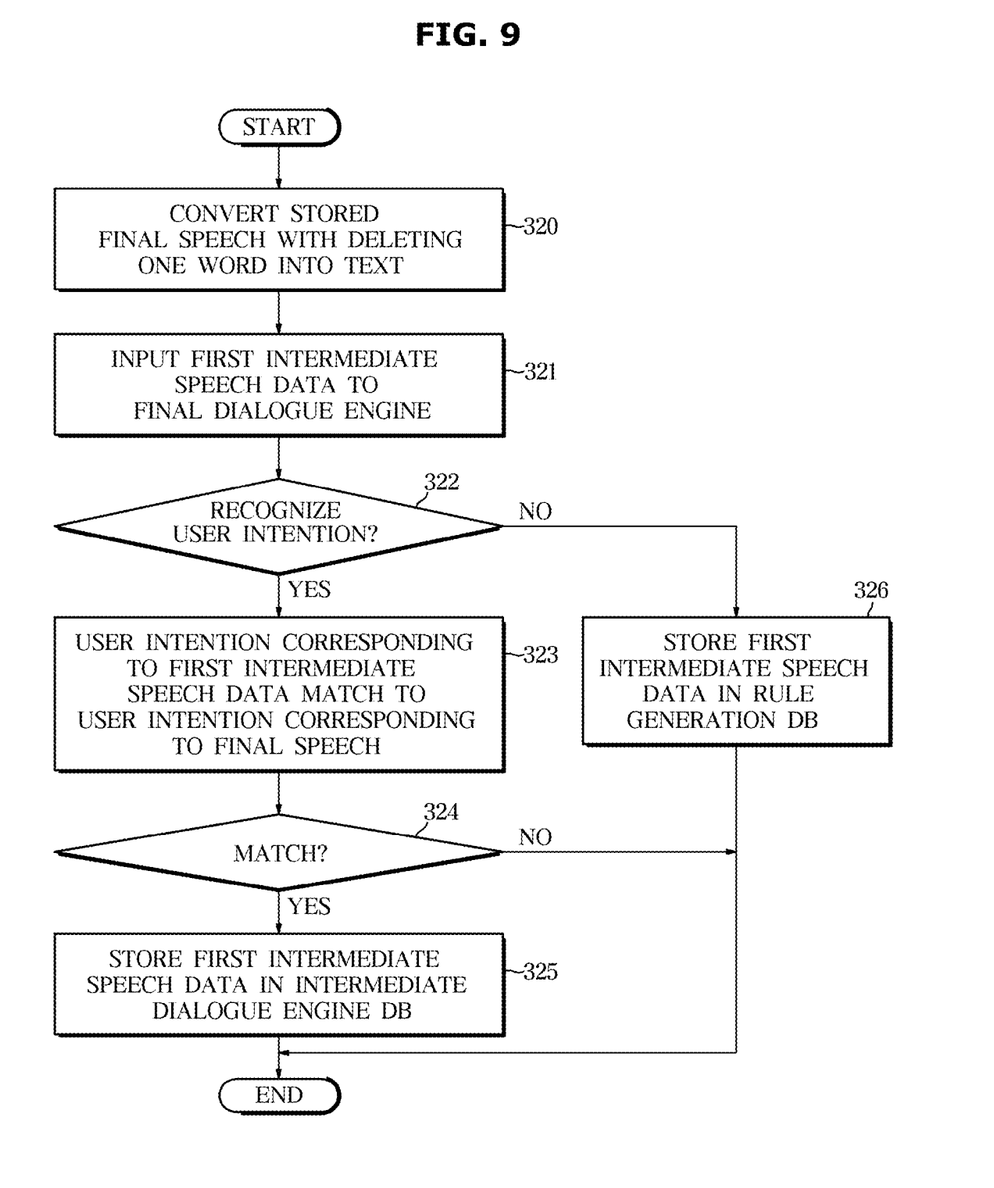
FIG. 9 is a flowchart illustrating a process of updating an intermediate dialogue engine using data stored in a log database (DB) according to an embodiment.

FIG. 9 is a flowchart illustrating a process of updating an intermediate dialogue engine using data stored in a log DB according to an embodiment.

According to the above-described embodiment, the log DB 153 stores the final speech and the corresponding user intention.

According to the dialogue processing method illustrated in FIG. 9, the controller 120 generates a first intermediate speech data by deleting one word from the final speech stored in the log DB 153 (320) and inputs the first intermediate speech data to the final dialogue engine 140.

When the final dialogue engine 140 recognizes the user intention corresponding to the first intermediate speech data (YES in 322), the controller 120 determines whether the user intention corresponding to the first intermediate data matches the user intention corresponding to the final speech stored in the log DB (323). If the user intention corresponding to the first intermediate speech data matches the user intention corresponding to the final speech stored in the log DB (Yes in 324), the first intermediate speech data is stored in the intermediate dialogue engine DB 154 (324).

In addition, the controller 120 deletes one word from the first intermediate speech data to generate the second intermediate speech data and inputs the second intermediate speech data into the final dialogue engine. The above-described process of recognizing the user intention is repeated until the speech data does not match the user intention corresponding to the final speech.

The controller 120 may be updated by learning the intermediate dialogue engine using the intermediate speech data stored in the intermediate dialogue engine DB 154.

On the other hand, when the final dialogue engine 140 fails to recognize the user's intention corresponding to the first intermediate speech data (NO in 322), the first intermediate speech data may be stored in the rule generation DB 155 (326).

The controller 120 may generate a rule used for the intermediate dialogue engine 130 by using the first intermediate speech data stored in the rule generation DB 155. A detailed description of the rule generation is provided in the above-described embodiment of the dialogue system 100.

In accordance with an embodiment, an electronic apparatus comprises: a memory configured to store one or more programs; and a processor configured to process the one or more stored programs. The one or more programs may include: converting a user speech inputted through a microphone into text in a real time; inputting the converted text to an intermediate dialogue engine processing intermediate speech when the user speech is not terminated; inputting the converted text to a final dialogue engine processing final speech when the user speech is terminated; and generating a system response corresponding to the user intention recognized by the intermediate dialogue engine or the user intention recognized by the final dialogue engine.

In addition, the program stored in the memory of the electronic device is for executing the above-described dialogue processing method. Each step included in the above-described dialogue processing method may be further included in the program executed by the processor.

As described above, the disclosed embodiments have been described with reference to the accompanying drawings. Those having ordinary skill in the art should understand that the present disclosure can be implemented in a form different from the disclosed embodiments without changing the technical spirit or essential features of the present disclosure. The disclosed embodiments are examples and should not be construed as limiting.

What is claimed is:

1. A dialogue system comprising:
a Speech to Text (STT) engine configured to convert a user speech inputted through a microphone into text in real time;
an intermediate dialogue engine configured to process an intermediate speech before a user speech is terminated to identify a user intention and to generate a system response corresponding to the user intention;
a final dialogue engine configured to process a final speech after the user speech is terminated;
a controller configured to input the converted text to the intermediate dialogue engine when the user speech is not terminated, and to input the converted text to the final dialogue engine when the user speech is terminated;
a Text to Speech (TTS) engine configured to convert the system response into a speech signal; and
a storage configured to store the final speech and the user intention, which is recognized by the final dialogue engine, corresponding to the final speech, when the user speech is terminated,
wherein the controller updates the intermediate dialogue engine based on the final speech and the user intention stored in the storage.

2. The dialogue system of claim 1, wherein
the intermediate dialogue engine generates the system response corresponding to the user intention in advance before the user speech is terminated.

3. The dialogue system of claim 2, wherein
the controller controls the TTS engine to output the pre-generated system response when the user speech is terminated.

4. The dialogue system of claim 1, wherein
the controller inputs a next user speech inputted through the microphone into the intermediate dialogue engine when the intermediate dialogue engine does not recognize the user intention.

5. The dialogue system of claim 1, wherein
the controller generates a first intermediate speech data by deleting one word from the stored final speech and inputs the first intermediate speech data to the final dialogue engine, in order to update the intermediate dialogue engine.

6. The dialogue system of claim 5, wherein
the controller stores the first intermediate speech data in the storage when the user intention corresponding to the first intermediate speech data recognized by the final dialogue engine corresponds to the user intention corresponding to the final speech, in order to update the intermediate dialogue engine.

7. The dialogue system of claim 6, wherein
the controller generates a second intermediate speech data by deleting one word from the first intermediate speech data when the user intention corresponding to the first intermediate speech data recognized by the final dialogue engine corresponds to the user intention corresponding to the final speech, and inputs the second intermediate speech data to the final dialogue engine, in order to update the intermediate dialogue engine.

8. The dialogue system of claim 6, wherein
the controller trains the intermediate dialogue engine by using the stored first intermediate speech data, in order to update the intermediate dialogue engine.

9. The dialogue system of claim 6, wherein
the controller generates a rule used in the intermediate dialogue engine by using the stored first intermediate speech data, in order to update the intermediate dialogue engine.

10. A dialogue processing method, the method comprising:
converting a user speech inputted through a microphone into text in real time;
inputting the converted text to an intermediate dialogue engine processing an intermediate speech when the user speech is not terminated;
inputting the converted text to a final dialogue engine processing a final speech when the user speech is terminated;
generating a system response corresponding to a user intention recognized by the intermediate dialogue engine or the user intention recognized by the final dialogue engine;
storing, in a storage, the final speech and the user intention, which is recognized by the final dialogue engine, corresponding to the final speech, when the user speech is terminated; and
updating the inter mediate dialogue engine based on the final speech and the user intention stored in the storage.

11. The method of claim 10, wherein
generating the system responses comprises generating the system response corresponding to the user intention in advance before the user speech is terminated when the intermediate dialogue engine recognizes the user intention.

12. The method of claim 11 further comprising:
outputting the pre-generated system response when the user speech is terminated.

13. The method of claim 12 further comprising:
inputting a next user speech inputted through the microphone into the intermediate dialogue engine when the intermediate dialogue engine does not recognize the user intention.

14. The method of claim 10 further comprising:
generating a first intermediate speech data by deleting one word from the stored final speech and inputting the first intermediate speech data to the final dialogue engine, in order to update the intermediate dialogue engine.

15. The method of claim 14 further comprising:
storing the first intermediate speech data in the storage when the user intention corresponding to the first intermediate speech data recognized by the final dialogue engine corresponds to the user intention corresponding to the final speech, in order to update the intermediate dialogue engine.

16. The method of claim 15 further comprising:
generating a second intermediate speech data by deleting one word from the first intermediate speech data when the user intention corresponding to the first intermediate speech data recognized by the final dialogue engine corresponds to the user intention corresponding to the final speech, and inputting the second intermediate speech data to the final dialogue engine, in order to update the intermediate dialogue engine.

17. The method of claim 15 further comprising:
training the intermediate dialogue engine by using the stored first intermediate speech data, in order to update the intermediate dialogue engine.

18. The method of claim 15 further comprising:
generating a rule used in the intermediate dialogue engine by using the stored first intermediate speech data, in order to update the intermediate dialogue engine.

19. An electronic apparatus comprising:
a memory configured to store one or more programs; and
a processor configured to process the one or more stored programs, wherein
the one or more programs comprise,
- converting a user speech inputted through a microphone into text in a real time,
- inputting the converted text to an intermediate dialogue engine processing intermediate speech when the user speech is not terminated,
- inputting the converted text to a final dialogue engine processing final speech when the user speech is terminated,
- generating a system response corresponding to a user intention recognized by the intermediate dialogue engine or the user intention recognized by the final dialogue engine,
- storing, in a storage, the final speech and the user intention, which is recognized by the final dialogue engine, corresponding to the final speech, when the user speech is terminated, and
- updating the intermediate dialogue engine based on the final speech and the user intention stored in the storage.

* * * * *